US008141168B2

(12) United States Patent
Nakayama et al.

(10) Patent No.: US 8,141,168 B2
(45) Date of Patent: Mar. 20, 2012

(54) SCANNING PROBE MICROSCOPE AND A METHOD TO MEASURE RELATIVE-POSITION BETWEEN PROBES

(75) Inventors: Tomonobu Nakayama, Saitama (JP); Seiji Higuchi, Kyoto (JP)

(73) Assignees: National Institute for Materials Science, Ibaraki (JP); Horiba, Ltd., Kyoto (JP)

( * ) Notice: Subject to any disclaimer, the term of this patent is extended or adjusted under 35 U.S.C. 154(b) by 235 days.

(21) Appl. No.: 12/374,775

(22) PCT Filed: Jul. 27, 2007

(86) PCT No.: PCT/JP2007/064773
§ 371 (c)(1),
(2), (4) Date: Jan. 22, 2009

(87) PCT Pub. No.: WO2008/013268
PCT Pub. Date: Jan. 31, 2008

(65) Prior Publication Data
US 2010/0005552 A1 Jan. 7, 2010

(30) Foreign Application Priority Data
Jul. 28, 2006 (JP) .............................. P2006-207230

(51) Int. Cl.
*G01Q 10/00* (2010.01)
*G01Q 20/00* (2010.01)
(52) U.S. Cl. ............. 850/6; 850/1; 850/2; 850/3; 850/5; 73/104; 73/105
(58) Field of Classification Search .................. 850/1, 2, 850/3, 5, 6, 7; 73/104, 105
See application file for complete search history.

(56) References Cited

U.S. PATENT DOCUMENTS

| 2002/0117611 A1* | 8/2002 | Kley | 250/234 |
| 2005/0269035 A1* | 12/2005 | Kawakami et al. | 156/598 |
| 2006/0032296 A1* | 2/2006 | Hare et al. | 73/105 |
| 2006/0243034 A1* | 11/2006 | Chand et al. | 73/104 |

FOREIGN PATENT DOCUMENTS

| JP | 07-134137 | 5/1995 |
| JP | 10-300758 | 11/1998 |
| JP | 2000-136994 | 5/2000 |
| JP | 2001-024038 | 1/2001 |
| JP | 2002-139414 | 5/2002 |

\* cited by examiner

*Primary Examiner* — David A Vanore
*Assistant Examiner* — Nicole Ippolito

(57) ABSTRACT

A main object of the present claimed invention is to provide a scanning probe microscope that can recognize a relative position between multiple probes accurately. The scanning probe microscope comprises multiple probes 21, 22, 23, 24 movable in the XYZ-directions, a stage 3 on which a specimen W is placed and that is movable in the XY-directions, a detecting part 6 that detects the physical properties that changes with the movements of each of the probes 21, 22, 23, 24 in the Z-direction according to the surface shape of the specimen W, at a time when each of the probes 21, 22, 23, 24 or the stage 3 is moved in the XY-directions, an image generating part 73 that images the surface image of the specimen W in response to the detected signals from the detecting part 6, and a relative position calculating part 75 that obtains the surface image based on each of the probes 21, 22, 23, 24 and obtained by the image generating part 73, when the stage 3 is moved in the XY-directions without changing a relative position between the probes 21, 22, 23 24 in the XY-directions, and calculates the relative position between the probes 21, 22, 23, 24 by checking the surface images obtained by the probes.

10 Claims, 6 Drawing Sheets

SCANNING PROBE MICROSCOPE AND A METHOD TO MEASURE RELATIVE-POSITION BETWEEN PROBES

FIELD OF THE ART

This invention relates to a scanning probe microscope (SPM), more specifically, a measurement and control of a relative position between probes of, so called, a multiple-scanning-probe microscope (MPSPM).

BACKGROUND ART

As this kind of the scanning probe microscope (SPM), there is a scanning tunneling microscope (STM) that measures a surface morphology of a specimen by detecting tunneling current as shown in, for example, the patent document 1. By using this kind of microscope, it becomes possible to observe the specimen at the atomic level.

In addition, a scanning tunneling microscope having multiple probes is used recently. By using this microscope, it is possible not only to monitor a surface morphology of a specimen but also to measure the properties, for example, electric resistance of the specimen.

It is necessary to move each of the probes to a position where the region to be measured locates before measuring the electric resistance. Conventionally, an optical microscope or an electron microscope has been used.

However, it is not possible for the optical microscope or the electron microscope to obtain sufficient resolution at the atomic level and to fully recognize the exact position of each of the probes and a mutual positional relationship between the probes (especially, a positional relationship between probe apexes facing to the specimen. As a result, at a time of adjusting the position of each of the probes, there is a problem that the probe might get damaged because the probes crash each other. Furthermore, in case of measuring the electric resistance, there is a problem that a measurement result is not highly accurate because the positions of each of the probes are not accurate.

Patent document 1: Japan patent laid-open number 2000-136994

DISCLOSURE OF THE INVENTION

Problems to be Solved by the Invention

The present claimed invention intends to solve all of the problems and a main object of this invention is to make it possible to recognize the relative position between multiple probes accurately and safely.

Means to Solve the Problems

More specifically, the scanning probe microscope in accordance with this invention is characterized by comprising multiple probes which are facing to a specimen and movable in the XY-directions parallel to a surface of the specimen and in the Z-direction perpendicular to the surface, a stage on which the specimen is placed and that is movable at least in the XY-directions, a detecting part that measures a physical quantity in the Z-direction depending on an interaction between the surface of the specimen and the probe, at a time when each of the probes and/or the stage is moved in the XY-directions, an image generating part that produces a surface image of the specimen in response to a detected signal from the detecting part, and a relative position calculating part that obtains the surface image based on each of the probes and obtained by the image generating part, at a time when the stage is moved in the XY-directions without changing a relative position between the probes in the XY-directions, and calculates a relative position between the probes by checking the surface images obtained by the probes.

In accordance with this arrangement, since the relative position between the probes in the XY-directions is not changed, it is possible to completely avoid crashing the probes with each other. In addition, since the relative position between the probes is calculated from the surface images obtained without changing the relative position between the probes in the XY-directions, it is possible to recognize the relative position between multiple probes accurately and safely. Furthermore, since the relative position between the probes is calculated by the use of the actual specimen, it is possible to accurately move the probes relative to the region to be measured, thereby enabling to measure the physical, chemical or mechanical properties of the specimen accurately.

As a concrete method for calculating the relative position conceived is that the relative position calculating part extracts the common portion observed in the surface images and calculates the relative position between the probes by overlapping the different surface images so as to make the extracted common portions coincide.

In addition, a method for measuring a relative position between probes of a scanning probe microscope in accordance with this invention comprises multiple probes which are facing to a specimen and movable in the XY-directions parallel to a surface of the specimen and in the Z-direction perpendicular to the surface, a stage on which the specimen is placed and that is movable at least in the XY-directions, a detecting part that measures a physical quantity in the Z-direction depending on an interaction between the surface of the specimen and the probe, at a time when each of the probes and/or the stage is moved in the XY-directions, an image generating part that produces a surface image of the specimen in response to a detected signal from the detecting part, and is characterized by that the surface image based on the each probe and obtained by the image generating part is obtained, at a time when the stage is moved in the XY-directions without changing a relative position between the probes in the XY-directions, and the relative position between the probes is calculated by checking the surface images obtained by the probes.

Effect of the Invention

In accordance with the invention of the above structure, since the relative position between the probes in the XY-directions is not changed, it is possible to completely avoid crashing the probes with each other. In addition, since the relative position between the probes is calculated from the surface images obtained without changing the relative position between the probes in the XY-directions, it is possible to recognize the relative position between multiple probes accurately and safely. Furthermore, since the relative position between the probes is calculated by the use of the actual specimen, it is possible to accurately move the probes relative to the region to be measured, thereby enabling to measure the physical, chemical or mechanical properties of the specimen accurately.

BEST MODES OF EMBODYING THE INVENTION

One embodiment of the present claimed invention will be explained with reference to drawings.

Figure 1:
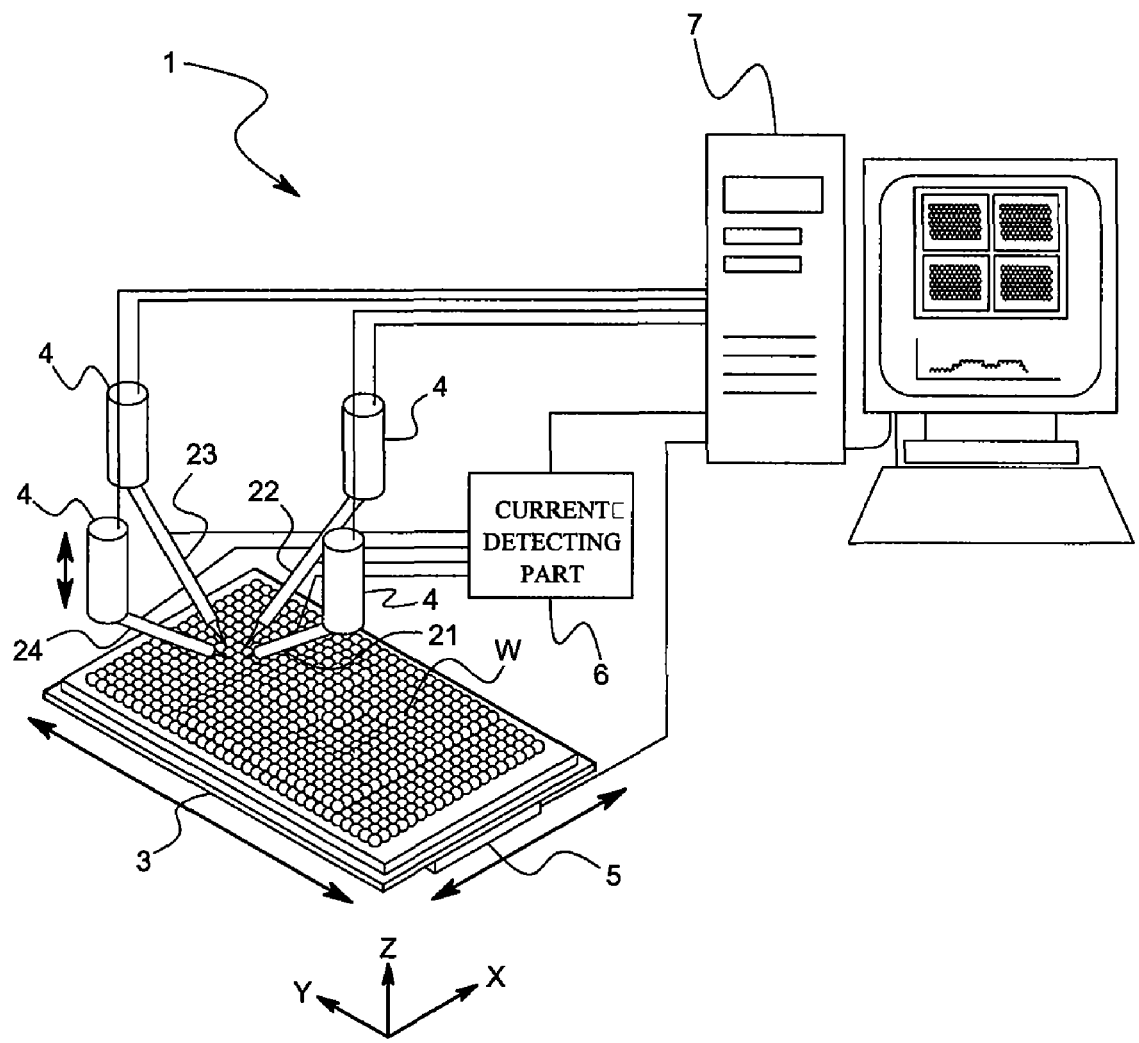
FIG. 1 is a pattern structure view of a scanning probe microscope in accordance with one embodiment of the present claimed invention.

A scanning probe microscope (SPM) 1 in accordance with this embodiment is a scanning tunneling microscope (STM) whose physical quantity as being an object to be measured is tunneling current and can be placed in the atmosphere. The scanning probe microscope 1 comprises, as shown in FIG. 1, multiple probes 21, 22, 23, 24 which are facing to a specimen W and movable in the XY-directions parallel to a surface of the specimen W and in the Z-direction perpendicular to the surface, a stage 3 on which the specimen is placed and that is movable in the XY-directions, a probe driving mechanism 4 that moves each of the probes 21, 22, 23, 24 in the XY-directions parallel to the surface of the specimen W and in the Z-direction perpendicular to the surface, a stage driving mechanism 5 that moves the stage 3 in the XY-directions, a current detecting part 6 that detects the tunneling current flowing in the probe 21, 22, 23, 24, and an information processing unit 7 that receives a current signal from the current detecting part 6, controls each of the probe driving mechanism 4 and the stage driving mechanism 5 based on the current signal and produces a STM image as being a surface image of the specimen W. In this embodiment, a voltage applied to the each probe 21, 22, 23, 24 is set to be −2.0[V] by means of a bias control part (not shown in drawings). The specimen W in this embodiment is a platinum (Pt) film coating on silicon (Si).

Each part will be explained.

The probe 21, 22, 23, 24 is made of tungsten (W) or platinum-iridium (Pt—Ir).

The probe driving mechanism 4 holds the probe 21, 22, 23, 24 and moves the probe 21, 22, 23, 24 in the XYZ-directions. More concretely, the probe driving mechanism 4 scans the probe 21, 22, 23, 24 in the XY-direction with being controlled by an XY-direction control part 71 and moves the probe 21, 22, 23, 24 in the Z-direction with being feed-back controlled by a Z-direction control part 72. The probe driving mechanism 4 uses piezoelectric slight movement elements and moves the probe 21, 22, 23, 24 by controlling a voltage value applied by the XY-direction control part 71 and the Z-direction control part 72.

The stage driving mechanism 5 is controlled by a stage position control part 72, to be described later, and moves the stage 3 in the XY-directions and the Z-direction. The stage driving mechanism 5 uses piezoelectric slight movement elements and moves the stage 3 by controlling a voltage value applied by the stage position control part 74.

An electric current detecting part 6 detects the tunneling current as being a physical quantity in the Z-direction depending on an interaction between the surface of the specimen W and the probe 21, 22, 23, 24, at a time when the probe 21, 22, 23, 24 or the stage 3 is moved in the XY-directions, and outputs the detected signal to the Z-direction control part 72.

Figure 2:
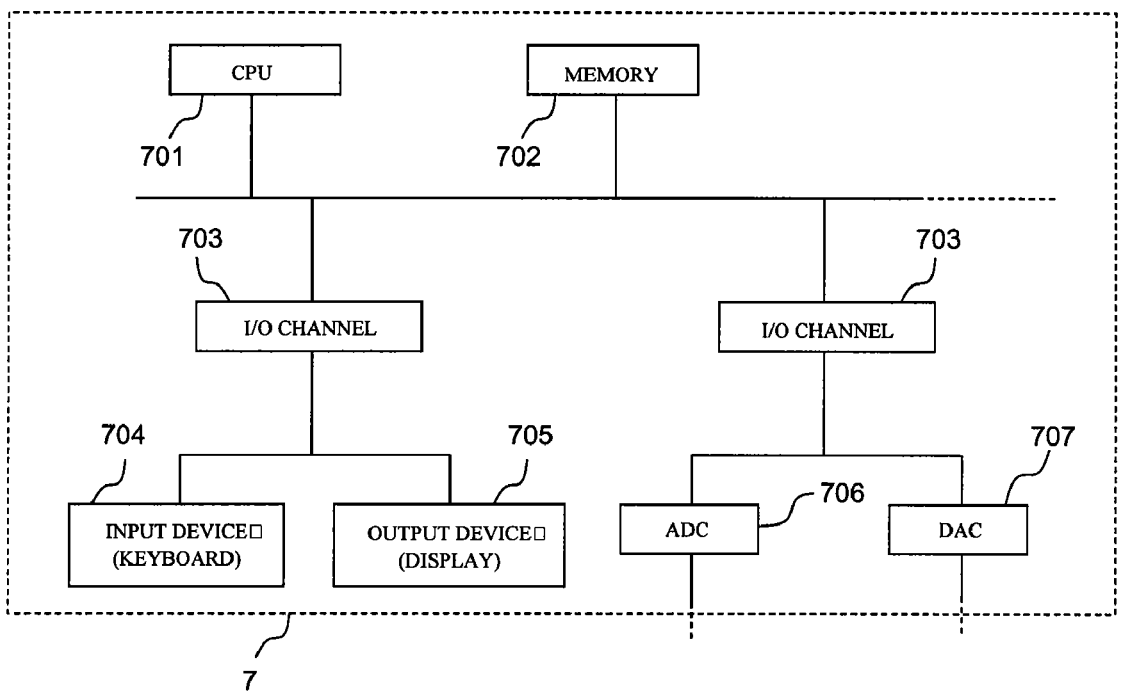
FIG. 2 is a structure view of an information processing unit of this embodiment.

The information processing unit 7 is a multi purpose or a dedicated computer comprising, as shown in FIG. 2, a CPU 701, a memory 702, an input-output channel 703, an input device 704 such as a keyboard and a display 705, and an analogue-digital translate circuit such as an A/D converter 706, a D/A converter 707 and an amplifier (not shown in drawings) is connected to the input-output channel 703.

Figure 3:
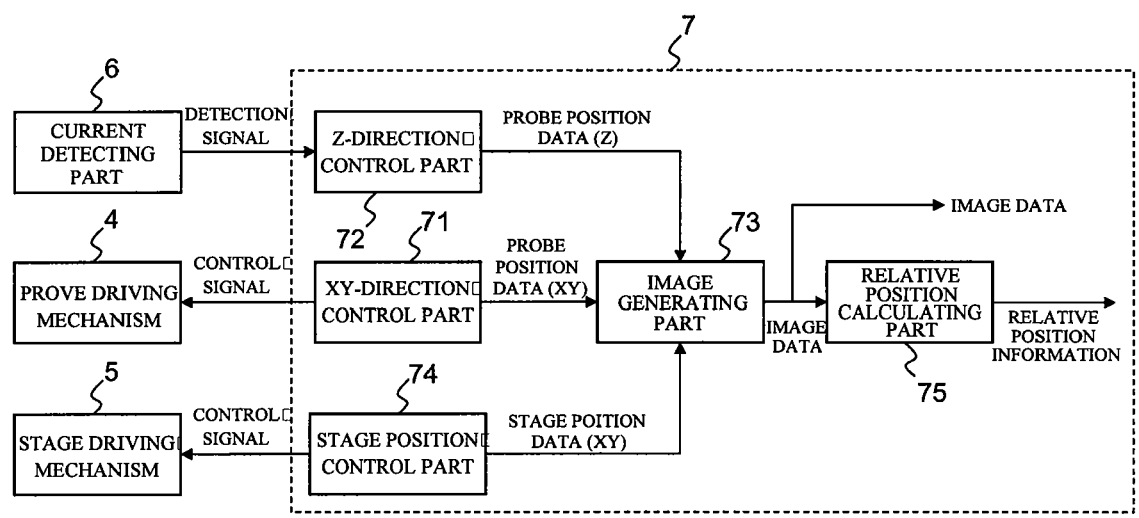
FIG. 3 is a structure view of the information processing unit of this embodiment.

The information processing unit 7 functions, as shown in FIG. 3, as the XY-direction control part 71, the Z-direction control part 72 and an image generating part 73 by operating the CPU 701 and its peripheral devices according to programs set in a predetermined area of the memory 702. The information processing unit 7 is not necessarily physically integrated, and may be divided into multiple devices connected through or without wire.

The part 71~73 will be explained in the following.

The XY-direction control part 71 controls the probe driving mechanism 4 to scan each of the probes 21, 22, 23, 24 in the XY-directions. More concretely, the XY-direction control part 71 adjusts the voltage value applied to the piezoelectric slight movement element constituting the probe driving mechanism 4 in the X-direction and the Y-direction. In addition, the XY-direction control part 71 outputs a positional data (for example, displacement from an initial position) of each probe 21, 22, 23, 24 in the XY-directions to the image generating part 73.

The Z-direction control part 72 receives a detecting signal from the current detecting part 6 and feed-back controls a height of the probe 21, 22, 23, 24 so as to make the tunneling current between the surface of the specimen W and each of the probe 21, 22, 23 24 constant (for example, $T_{ref}$=300 [pA]) based on the detecting signal. More concretely, the Z-direction control part 72 adjusts the voltage value applied to the piezoelectric slight movement element constituting the probe driving mechanism 4 in the Z-direction. In addition, the Z-direction control part 71 outputs a positional data (for example, displacement from an initial position) of each probe 21, 22, 23, 24 in the Z-direction to the image generating part 73.

The image generating part 73 obtains the positional data in the XY-directions from the XY-direction control part 71 and the positional data in the Z-direction from the Z-direction control part 72 and produces the STM image as being the surface image of the specimen W. The image generating part 73 outputs the data of the STM image to the display 705 and/or a relative position calculating part 75, to be described later.

The information processing unit 7 in this embodiment further comprises a stage position control part 74 and the relative position calculating part 75.

The stage position control part 74 controls the stage driving mechanism 5, and more concretely, controls a voltage value applied to the piezoelectric slight movement elements constituting the stage driving mechanism 5.

In this embodiment, at a stage prior to measurement of the physical properties, the stage 3 is scanned from the initial position (a position prior to moving the stage 3) within a predetermined range in the XY-directions by means of a raster scanning method. The stage position control part 74 controls the stage driving mechanism 5 so that a scanning area becomes, for example, 5000 nm×5000 nm. More concretely, the stage position control part 74 controls the stage driving mechanism 5 so as to scan the stage 3 from the initial position to −2500 nm~2500 nm in the X-direction and to −2500 nm~2500 nm in the Y-direction. After the scanning of the predetermined range is completed, the stage position control part 74 controls the stage 3 to be returned to the initial position. Then a probe apex facing to the specimen of each probe 21, 22, 23, 24 locates at a center of the produced each STM image.

The relative position calculating part 75 obtains the STM image based on each of the probes 21, 22, 23, 24 and obtained by the image generating part 73, at a time when the stage 3 is moved in the XY-directions without changing a relative position between the probes 21, 22, 23, 24 in the XY-directions, and calculates the relative position between the probes 21, 22, 23, 24 by checking each of the STM images.

Concretely, before measuring the physical properties, the relative position calculating part 75 obtains the STM image of each probe 21, 22, 23, 24 obtained by scanning the stage 3 from the image generating part 73 and judges four STM images by means of a pattern matching method.

An object of the pattern matching method is to recognize a commonly-observed portion in each of the STM images and to lap four STM images so as to overlap the commonly-observed portion.

Figure 4:
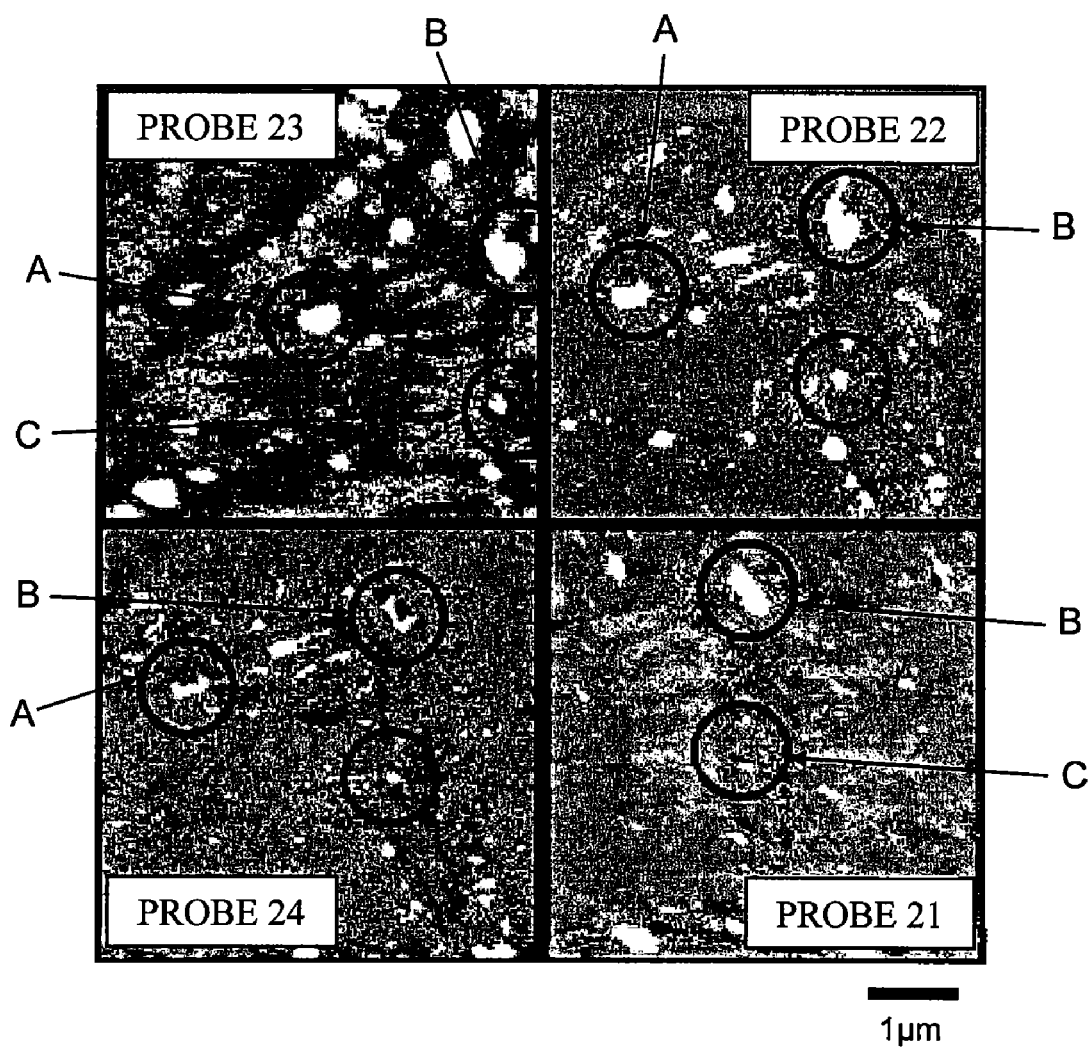
FIG. 4 shows STM images obtained by four different probes.
Figure 5:
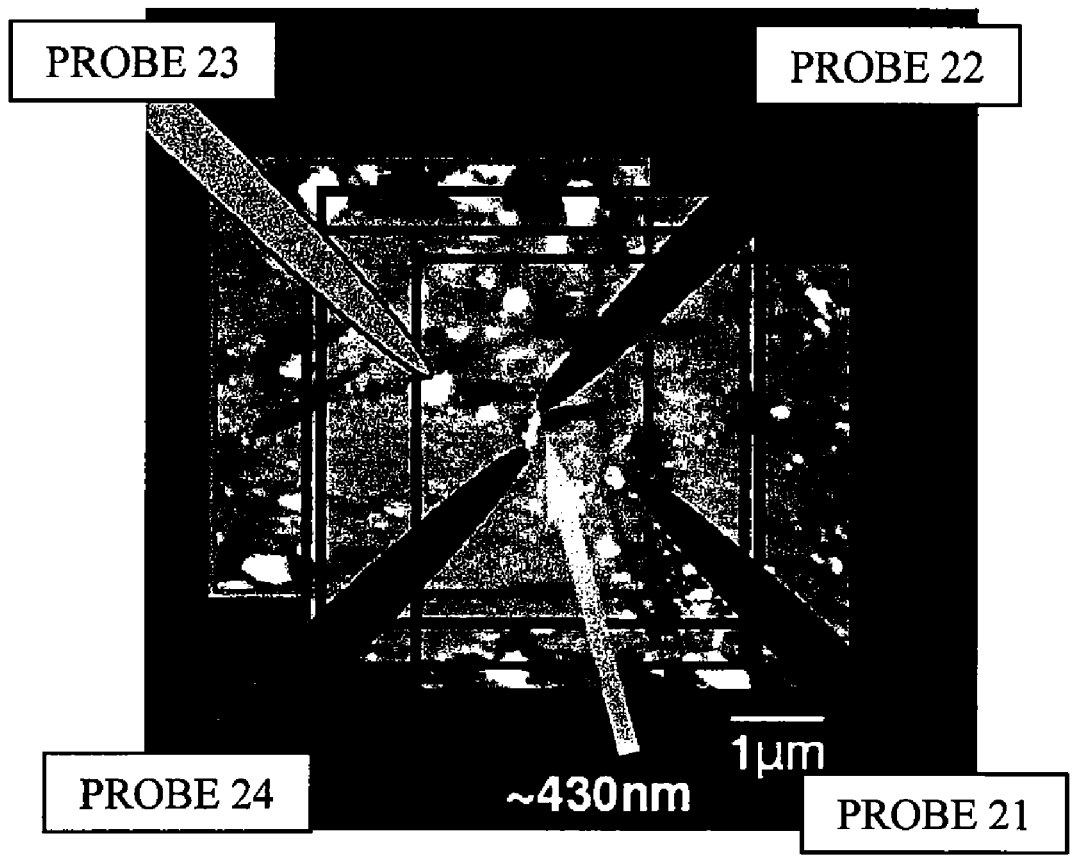
FIG. 5 is a view showing a relative position of each STM image and each probe determined by a pattern matching method.

More specifically, an outline of the distinctive common portion A, B, C that is commonly observed in each of the STM images, as shown in FIG. 4, is extracted by means of, for example, an edge detection method. Then each of the STM images is overlapped so as to make the common portions A, B, C of the surface images coincide as shown in FIG. 5. Since each of the probes 21, 22, 23, 24 locates at a center portion of each of the STM images, it is possible to recognize the relative distance between the probes 21, 22, 23, 24. In accordance with FIG. 5 wherein each of the STM images is overlapped, the relative distance between the probe 22 and the probe 24 turns out to be ~430 [nm].

Figure 6:
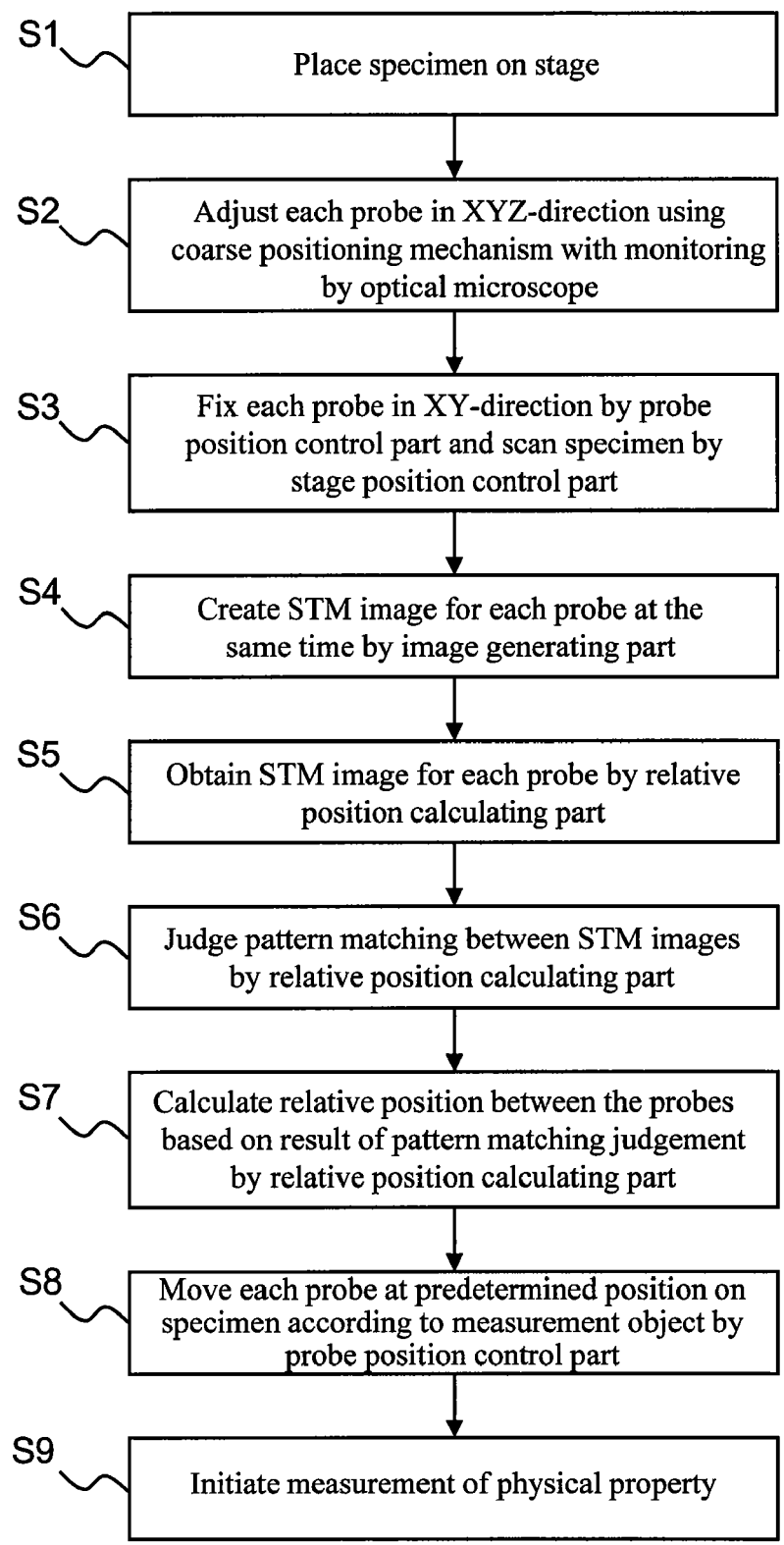
FIG. 6 is a flow chart showing a measurement procedure including a procedure for calculating a relative position in this embodiment.

A procedure to measure the physical properties by the use of the scanning probe microscope in this embodiment will be explained with reference to a flow chart in FIG. 6.

First, an operator places the specimen $\underline{W}$ on the stage 3 (step S1).

Then, the operator adjusts the position of each of the probes 21, 22, 23, 24 in a range of a scale from millimeter to micrometer respectively by the use of a coarse positioning mechanism, not shown in drawings, with monitoring an optical microscope, not shown in drawings, so as to make the proves 21, 22, 23, 24 approach each other in the XY-directions. At the same time, the operator adjusts the position of each of the probes 21, 22, 23, 24 in the Z-direction by the use of the coarse positioning mechanism, not shown in drawings, so as to make each distal end of the probes 21, 22, 23, 24 close to the surface of the specimen $\underline{W}$ (step S2).

Next, the operator inputs an $\overline{\text{input}}$ signal to the information processing unit 7 by the use of the input device 704 such as the keyboard so that the stage position control part 74 scans the specimen $\underline{W}$ by moving the stage 3 (step S3) without changing the $\overline{\text{position}}$ of the probes 21, 22, 23, 24 in the XY-directions by the use of the XY-direction control part 71, and the image generating part 73 produces the STM images of the four probes 21, 22, 23, 24 at once (step S4).

Then the relative position calculating part 75 obtains the image data showing the above-mentioned STM image from the image generating part 73 (step S5). The relative position calculating part 75 checks the STM images so as to find the common part, overlaps each of the STM images so as to make the common part coincide (step S6), and then calculates the relative position between the probes 21, 22, 23, 24 (step S7).

Later, the XY-direction control part 71 moves each of the probes 21, 22, 23, 24 to the predetermined position on the specimen $\underline{W}$ in accordance with an object to be measured input by the $\overline{\text{operator}}$ (step S8). At this time, each of the probes 21, 22, 23, 24 may be moved one by one to the predetermined position with keeping the relative position therebetween, and may be moved independently to the predetermined position without keeping the relative position therebetween.

After the above-mentioned steps, measurement of physical, chemical or mechanical properties is initiated (step S9).

With the scanning probe microscope 1 in accordance with this embodiment having this structure, since the relative position between the probes 21, 22, 23, 24 in the XY-directions is not changed, it is possible to completely avoid crashing the probes 21, 22, 23, 24 with each other. In addition, since the relative position between the probes 21, 22, 23, 24 is calculated from the surface images obtained without changing the relative position between the probes 21, 22, 23, 24 in the XY-directions, it is possible to recognize the relative position between multiple probes 21, 22, 23, 24 accurately and safely. Furthermore, since the relative position between the probes 21, 22, 23, 24 is calculated by the use of the actual specimen $\underline{W}$, it is possible to accurately move the probe 21, 22, 23, 24 $\overline{\text{relative}}$ to the specimen $\overline{W}$ to be measured, thereby enabling to measure the physical, $\overline{\text{chemical}}$ or mechanical properties of the specimen $\overline{W}$ accurately.

In addition, $\overline{\text{since}}$ the STM image for calculating the relative position is obtained by moving the specimen $\underline{W}$ in the XY-directions without changing the position of $\overline{\text{the}}$ four probes 21, 22, 23, 24 in the XY-directions, it is possible to prevent the probes 21, 22, 23, 24 from crashing each other which might happen in case each probe 21, 22, 23, 24 moves independently in the XY-directions, thereby preventing the probes 21, 22, 23, 24 from getting damaged.

Furthermore, since the relative position between the probes 21, 22, 23, 24 is calculated by the use of the STM image having a resolution at the atomic level obtained without changing the relative position between the probes 21, 22, 23, 24 in the XY-directions, it is possible to recognize the relative position between multiple probes 21, 22, 23, 24 accurately and safely.

In addition, since the positional correction can be conducted not on every four probe 21, 22, 23, 24 but on the stage 3 alone, it is possible to improve an accuracy of the STM image.

Furthermore, since the relative position between the probes 21, 22, 23, 24 is calculated by the use of the actual specimen $\underline{W}$, it is possible to move the probes 21, 22, 23, 24 accurately, $\overline{\text{thereby}}$ enabling to measure the physical or chemical properties of the specimen $\underline{W}$ accurately. The scanning probe microscope 1 can be preferably used for measuring the physical properties of a carbon nano tube (CNT), a nano wire or a monomolecular film that especially requires an accurate position adjustment of the probe 21, 22, 23, 24. In addition, since the scanning probe microscope 1 is used to be placed in the atmosphere, there is no need of a vacuum unit, thereby enabling downsizing.

The present claimed invention is not limited to the above-mentioned embodiment.

For example, the scanning probe microscope (SPM) in each of the above-mentioned embodiments is the scanning tunneling microscope (STM) whose the physical quantity as being the object to be detected is the tunneling current. In addition, the scanning probe microscope (SPM) may be an atomic force microscope (AFM) that detects an atom force, a near-field scanning optical microscope (NSOM) that detects near-field light, a magnetic force microscope (MFM) that detects magnetic force, a frictional force microscope (FFM) that detects frictional force, a scanning near-field acoustic microscope (SNAM) that detects ultrasonic waves, and a scanning ion conductance microscope (SICM) that detects ion conductance.

In addition, a number of the probe is four in the above-mentioned embodiment, however it may be two, three or more than five.

Furthermore, in the above-mentioned embodiment, the scanning tunneling microscope is used to be placed in the atmosphere, however, it may be used to be placed in vacuum.

In addition, a part or all of the above-mentioned embodiment or the modified embodiment may be appropriately combined, and it is a matter of course that the present claimed invention is not limited to the above-mentioned embodiment and may be variously modified without departing from a spirit of the invention.

POSSIBLE APPLICATIONS IN INDUSTRY

In accordance with the invention of the above structure, since the relative position between the probes in the XY-directions is not changed, it is possible to completely avoid crashing the probes with each other. In addition, since the relative position between the probes is calculated from the surface images obtained without changing the relative position between the probes in the XY-directions, it is possible to recognize the relative position between multiple probes accurately and safely. Furthermore, since the relative position between the probes is calculated by the use of the actual specimen, it is possible to accurately move the probe relative to the region to be measured, thereby enabling to measure the physical, chemical or mechanical properties of the specimen accurately.

The invention claimed is:

1. A scanning probe microscope comprising:
    multiple measuring probes which are facing to a specimen and individually movable in the XY-directions parallel to a surface of the specimen and in the Z-direction perpendicular to the surface,
    a stage on which the specimen is placed and that is movable at least in the XY-directions,
    a detecting part that measures a physical quantity in the Z-direction depending on an interaction between the surface of the specimen and the probe, at a time when each of the probes and/or the stage is moved in the XY-directions,
    an image generating part that produces a surface image of the specimen in response to a detected signal from the detecting part, and
    a relative position calculating part that obtains the surface image based on each of the probes and obtained by the image generating part, at a time when the stage is moved in the XY-directions before at least measurement of a property of the specimen without changing a relative position between the probes in the XY-directions, and calculates the relative position between the probes by checking the surface images obtained by the probes before at least measurement of a property of the specimen.

2. The scanning probe microscope described in claim 1, wherein the relative position calculating part extracts a common portion in each of the surface images and calculates the relative position between the probes by overlapping the different surface images so as to make the extracted common portions coincide.

3. The scanning probe microscope described in claim 1 wherein the image generating part produces a separate probe image for each probe with an apex of the probe located at a center of the image.

4. The scanning probe microscope described in claim 3 wherein the relative position calculating part determines the existence of the same commonly-observed portions on each separate probe image and provides a composite image of overlapped commonly-observed portions.

5. The scanning probe microscope described in claim 4 wherein the same commonly-observed portions are determined by an edge detection procedure.

6. The scanning probe microscope described in claim 4 wherein the relative distance between the respective probes are determined from the composite image by the relative position calculating part.

7. The scanning probe microscope described in claim 3 wherein the separate image for each probe is based on an atomic level resolution of the detecting part.

8. The scanning probe microscope described in claim 1 further including a stage driving mechanism for moving the specimens wherein the specimen is moved in a predetermined XY direction to provide a separate surface image for each probe with an apex of the probe located at a center of the image while the multiple probes are not independently driven.

9. A method for measuring a relative position between probes of a scanning probe microscope comprising:
    multiple probes which are facing to a specimen and movable in the XY-directions parallel to a surface of the specimen and in the Z-direction perpendicular to the surface,
    a stage on which the specimen is placed and that is movable at least in the XY-directions,
    a detecting part that detects a physical quantity in the Z-direction depending on an interaction between the surface of the specimen and the probe, at a time when each of the probes and/or the stage is moved in the XY-directions, and
    an image generating part that produces a surface image of the specimen in response to a detected signal from the detecting part, wherein
    the surface image based on the each of the probes and obtained by the image generating part is obtained, at a time when the stage is moved in the XY-directions without changing a relative position between the probes in the XY-directions, and the relative position between the probes is calculated by checking the surface images obtained by the probes.

10. A method for measuring a relative position between multiple probes of a scanning probe microscope, the scanning probe microscope having the multiple probes movable in X-Y directions parallel to a stage support surface for positioning a specimen and in a Z-direction perpendicular to the stage support surface, a stage driving mechanism for driving the stage support surface, a detecting part that measures a physical characteristic in the Z-direction depending on an interaction between the surface of the specimen and the probe during relative movement of the probe and specimen, an image generating part producing a separate image for each probe, in response to a detected signal from each probe, and a relative position calculating part to calculate a relative position between the multiple probes comprising the steps of:
    placing a specimen on a stage support surface;
    positioning the multiple probes in an operative position relative to the specimen;

moving the specimen relative to the multiple probes by the stage driving mechanism prior to measurement of a property of a specimen, while keeping the multiple probes in a fixed relative distance from each respective probe;

determining commonly-observed portions on each separate probe image and providing a composite image of overlapped probe images based on the commonly-observed positions;

determining the relative distances between the respective probes from the composite images to verify an acceptable measurement probe off-set distance for measuring a property of the specimen; and proceeding with a measurement of the property of the specimen by the multiple probes.

\* \* \* \* \*